(12) United States Patent
Schaepe et al.

(10) Patent No.: US 7,467,159 B2
(45) Date of Patent: Dec. 16, 2008

(54) GENERATING APPLICATIONS THAT ANALYZE IMAGE DATA USING A SEMANTIC COGNITION NETWORK

(75) Inventors: Arno Schaepe, Munich (DE); Maria Athelogou, Munich (DE); Ursula Benz, Alling (DE); Christof Krug, Munich (DE); Gerd Binnig, Wollerau (CH)

(73) Assignee: Definiens AG, Munich (DE)

( * ) Notice: Subject to any disclaimer, the term of this patent is extended or adjusted under 35 U.S.C. 154(b) by 254 days.

(21) Appl. No.: 11/582,225

(22) Filed: Oct. 17, 2006

(65) Prior Publication Data
US 2007/0036440 A1    Feb. 15, 2007

Related U.S. Application Data

(63) Continuation of application No. 10/687,477, filed on Oct. 15, 2003, now Pat. No. 7,146,380.

(30) Foreign Application Priority Data
Oct. 15, 2002   (DE)   ............................ 102 48 013

(51) Int. Cl.
*G06F 17/30* (2006.01)
(52) U.S. Cl. .................. 707/103 X; 707/102
(58) Field of Classification Search .. 707/103 R–103 Z, 707/102, 104.1; 717/100, 101, 120, 121
See application file for complete search history.

(56) References Cited

U.S. PATENT DOCUMENTS

| | | | |
|---|---|---|---|
| 5,537,485 A | 7/1996 | Nishikawa et al. | 382/130 |
| 5,671,353 A * | 9/1997 | Tian et al. | 714/48 |
| 5,778,378 A * | 7/1998 | Rubin | 707/103 R |
| 5,872,859 A | 2/1999 | Gur et al. | 382/128 |
| 6,018,728 A | 1/2000 | Spence et al. | 706/20 |
| 6,058,322 A | 5/2000 | Nishikawa et al. | 600/408 |
| 6,075,878 A | 6/2000 | Yoshida et al. | 382/132 |
| 6,075,879 A | 6/2000 | Roehrig et al. | 382/132 |
| 6,246,782 B1 | 6/2001 | Shapiro et al. | 382/128 |
| 6,282,305 B1 | 8/2001 | Huo et al. | 382/128 |
| 6,320,976 B1 | 11/2001 | Murthy et al. | 382/128 |

(Continued)

FOREIGN PATENT DOCUMENTS

DE    199 08 204 A1    10/1998

(Continued)

*Primary Examiner*—Cheryl Lewis
(74) *Attorney, Agent, or Firm*—Imperium Patent Works; Darien K. Wallace

(57) ABSTRACT

A method is disclosed for generating an application that analyzes image data, such as from satellite and microscope pictures. The method uses a graphical user interface to add a new processing object to a processing object network. The processing object network includes a parent processing object and a child processing object. A user can append a new processing object to the child processing object or can add the new processing object as a subprocess to the parent processing object. The user selects a data domain and an algorithm from selection lists on the graphical user interface and adds them to the new processing object. The application uses a semantic cognition network to process data objects that are generated by segmenting the image data. The application then uses the new processing object to identify portions of the image that are to be highlighted on the graphical user interface.

24 Claims, 7 Drawing Sheets

U.S. PATENT DOCUMENTS

| | | |
|---|---|---|
| 6,324,532 B1 | 11/2001 | Spence et al. .................. 706/27 |
| 6,389,305 B1 | 5/2002 | Deban et al. .................. 600/427 |
| 6,453,058 B1 | 9/2002 | Murthy et al. ............... 382/128 |
| 6,574,357 B2 | 6/2003 | Wang .......................... 382/132 |
| 6,625,303 B1 | 9/2003 | Young et al. ................. 382/132 |
| 6,650,766 B1 | 11/2003 | Rogers et al. ................ 382/132 |
| 6,763,128 B1 | 7/2004 | Rogers et al. ................ 382/130 |
| 6,801,645 B1 | 10/2004 | Collins et al. ............... 382/130 |
| 6,937,776 B2 | 8/2005 | Li et al. ....................... 382/260 |
| 6,944,603 B2 * | 9/2005 | Bergan et al. .................. 706/45 |
| 6,970,587 B1 | 11/2005 | Rogers ........................ 382/132 |
| 2002/0188436 A1 | 12/2002 | Schmidt et al. ................. 704/1 |
| 2003/0115175 A1 * | 6/2003 | Baatz et al. ..................... 707/1 |
| 2004/0006765 A1 * | 1/2004 | Goldman .................... 717/116 |
| 2004/0148296 A1 | 7/2004 | Schaepe et al. ............. 707/100 |

FOREIGN PATENT DOCUMENTS

WO        WO 01/45033 A2     12/1999

* cited by examiner

US 7,467,159 B2

GENERATING APPLICATIONS THAT ANALYZE IMAGE DATA USING A SEMANTIC COGNITION NETWORK

CROSS REFERENCE TO RELATED APPLICATION

This application is a continuation of, and claims priority under 35 U.S.C. §120 from, nonprovisional U.S. patent application Ser. No. 10/687,477 U.S. Pat No. 7,146,380, entitled "Extracting Information from Input Data Using a Semantic Cognition Network," filed on Oct. 15, 2003. application Ser. No. 10/687,477 in turn is a continuation of, and claims the benefit under 35 U.S.C. §119 from, German Application No. 102 48 013.3, filed on Oct. 15, 2002, in Germany. The subject matter of each of the foregoing documents is incorporated herein by reference.

TECHNICAL FIELD

The present invention relates generally to computer-implemented methods for extracting information from input data and, more specifically, to such methods employing semantic cognition networks.

BACKGROUND

There are known semantic networks that are formalisms for knowledge representation in the field of artificial intelligence. A semantic network includes semantic units and linking objects. The linking objects link respective semantic units and define the type of the link between the respective semantic units. However, it is not possible to expand, delete or amend the knowledge that is present in the semantic units and the linking objects of the semantic network.

From WO 01/45033 A1 there is known a computer-implemented method for processing data structures using a semantic network. Processing objects comprising algorithms and execution controls act on semantic units to which there is a link. Processing objects can be linked to a class object to thereby be able to perform local adaptive processing. The processing objects can use a plurality of algorithms.

According to the aforementioned document a new approach is used for object-oriented data analysis and especially picture analysis. The main difference between this method and pixel-oriented picture analysis is that in this method classification of object primitives is performed and used in further segmentation steps. These object primitives are generated during segmentation of the picture. For this purpose a so-called multi-resolution segmentation can be performed. The multi-resolution segmentation allows for segmentation of a picture in a network of homogenous picture region in each resolution selected by a user. The object primitives represent picture information in an abstract form.

As classified information carriers within a picture object network such object primitives and also other picture objects derived from such object primitives offer several advantages as compared to classified pixel.

In general, the semantic network comprises two essential components. The first one is a data object network such as a picture object network and the second one is a class object network. Beside the multi-resolution segmentation there is also the possibility of performing a so-called classification-based segmentation.

As mentioned above, the processing objects can be linked to class objects and therefore knowledge which is present in the semantic network can be expanded, deleted or amended by using the processing objects.

However, there exist several problems. The processing objects perform a local adaptive processing in the semantic network. The important aspects of local adaptive processing are analyzing and modifying objects but also navigating through the semantic network according to linking objects. However, the aspect of navigating is not covered by the aforementioned method.

SUMMARY

In one embodiment, a method extracts information from input data by mapping the input data into a data object network. The input data is represented by semantic units. The method uses a semantic cognition network comprised of the data object network, a class object network and a processing object network. The semantic cognition network uses a set of algorithms to process the semantic units. The semantic cognition network defines a processing object in the processing object network by selecting a data domain in the data object network, a class domain in the class object network and an algorithm from the set of algorithms. The processing object comprises the data domain, the class domain and the algorithm. The processing object is used in the processing object network to process the semantic units.

In another embodiment, a system extracts information from input data using a semantic cognition network.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Both a computer-implemented method and a system are disclosed for extracting information from input data. The system can be implemented both on a single computer and on a distributed network of computers such as a local area network (LAN) or a wide area network (WAN). The constituents of a semantic cognition network, also simply called a semantic network, may be implemented in both a centralized and a decentralized form of a WAN. As the structure of distributed networks of computers upon which the system is implemented is commonly known in the art, a detailed description of such distributed networks of computers is omitted here.

In the exemplary embodiment described below, a system is described that processes image data. In other embodiments, however, other types of data are processed. For example, other embodiments process data structures provided in a topological context. In addition, yet other embodiments can process data structures in the form of audio data, text data or statistically acquired data (data mining).

With regard to the terms "semantic network", "semantic unit", "linking object" and "processing object" as used in this application reference is made to WO 01/45033 A1 which is fully incorporated herein by reference.

Figure 1:
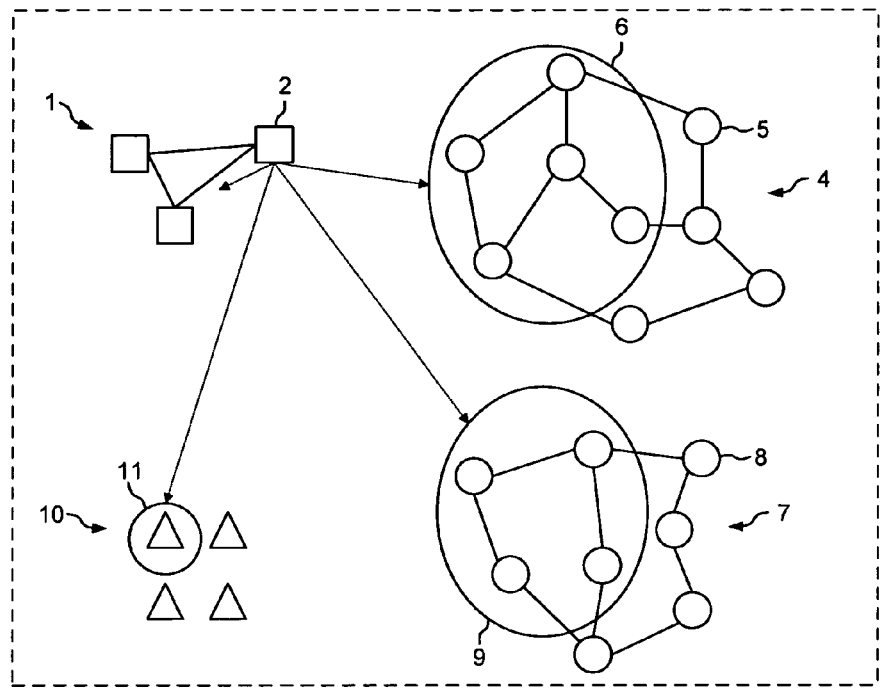
FIG. 1 is a schematic diagram of a system for extracting information from input data.

FIG. 1 is a schematic representation of a structure of a semantic cognition network according to an embodiment of the present invention. The semantic cognition network comprises four separate sub-networks: a processing network 1, a data object network 4, a class object network 7 and a set of algorithms 10. All objects contained in this semantic cognition network are semantic units.

The processing object network 1 comprises a plurality of processing objects 2. The data object network 4 comprises a plurality of data objects 5. A predetermined data domain 6 is chosen from among the plurality of data objects 5, depending upon the given situation as is described below. The class object network 7 comprises a plurality of class objects 8. A predetermined class domain 9 is chosen from among the plurality of class objects 8, depending upon the given situation as is described below. The set of algorithms 10 comprises a plurality of algorithms 11. A predetermined algorithm 11 is chosen from among the set of algorithms 10, depending upon the given situation as is described below.

Figure 2:
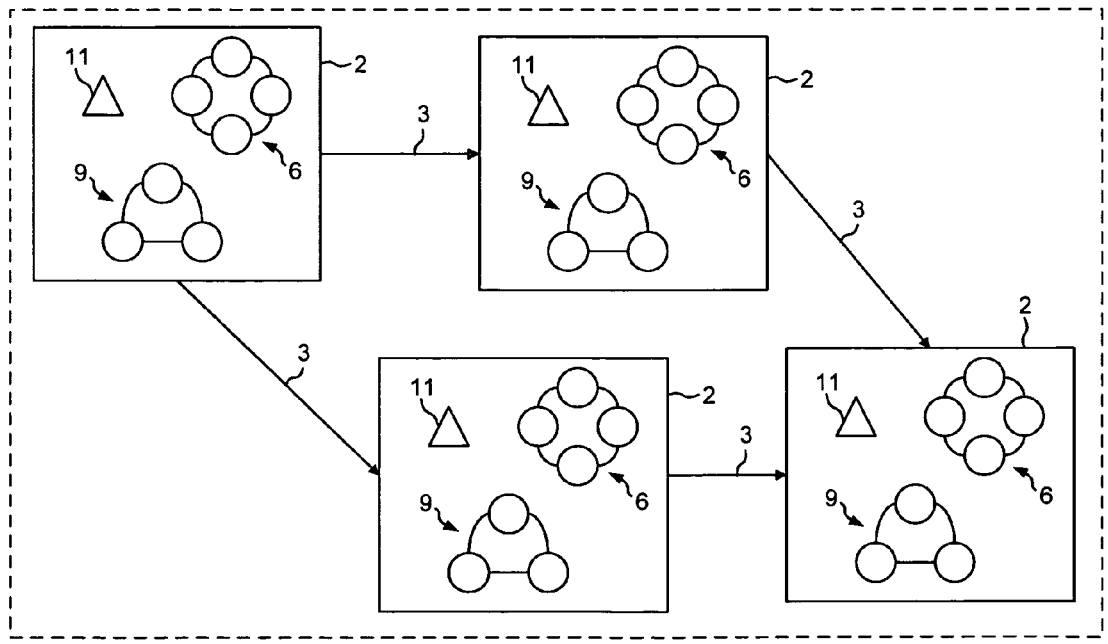
FIG. 2 is a diagram of a structure of domains and processing objects used by the system of FIG. 1.

FIG. 2 is a schematic representation of a structure of domains and processing objects 2. Each of processing objects 2 comprises a data domain 6, a class domain 9 and an algorithm 11. The various processing objects 2 are connected via linking objects 3 and together constitute a process network. The networking of the processing objects 2 via linking objects 3 defines an execution control. The execution control is a flow control for executing various processing objects 2. The execution control defines which processing object 2 is executed next after the execution of a previous processing object 2 is completed.

A processing object 2 is an object to perform an analysis operation, such as a picture analysis operation within a given project. As shown in FIG. 2, each processing object 2 comprises an algorithm 11, a data domain 6 and a class domain 9. The algorithm 11 defines what operation shall be performed. The data domain 6 defines where the operation is performed and which data object or data objects are processed by the algorithm 11. The class domain 9 defines under which criterion or criteria the operation is performed and which class or classes shall be used.

Due to the different domains and algorithms that can be selected depending on the given application, processing objects 2 can selectively act on predetermined data objects 5 and on predetermined class objects 8 by using a predetermined algorithm 11. For example, a predetermined segmentation algorithm is applied only to sub-data objects of a selected data object 5 within the data object network 4.

Figure 3:
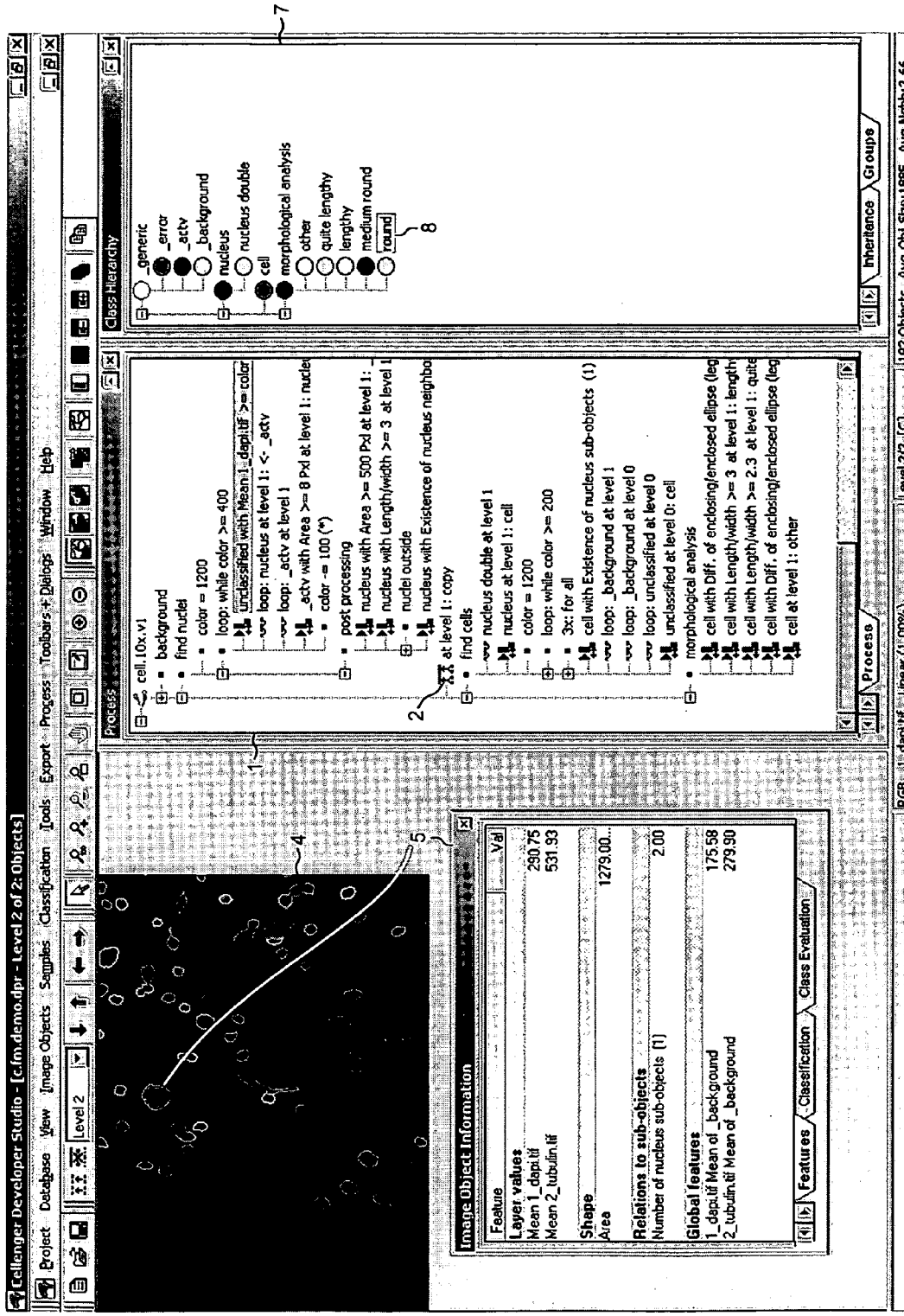
FIG. 3 is a screen shot of a graphical user interface of data objects, class objects and algorithm objects used by the system of FIG. 1.

FIG. 3 shows a screen shot of a graphical user interface of data objects 5, class objects 8 and algorithms 11. A user can select data objects 5, class objects 8, algorithms 11, and other settings to implement a desired application. Input data in the form of an image appears in the upper left window of the graphical user interface in FIG. 3. In the same upper left window, the data object network 4 comprising data objects 5 is displayed as an overlay. Individual data objects 5 can be selected and highlighted with an input device. Feature data of a selected data object 5 is displayed in the window labeled "Image Object Information".

Information relating to the processing object network 1 appears in the window with a tab labeled "Process". Such information includes processing objects 2 and related linking objects representing the execution control. Information relating to class object network 7 appears in the window labeled "Class Hierarchy". Such information includes the class objects 8 and related linking objects representing a semantic grouping of the class objects 8.

Figure 4:
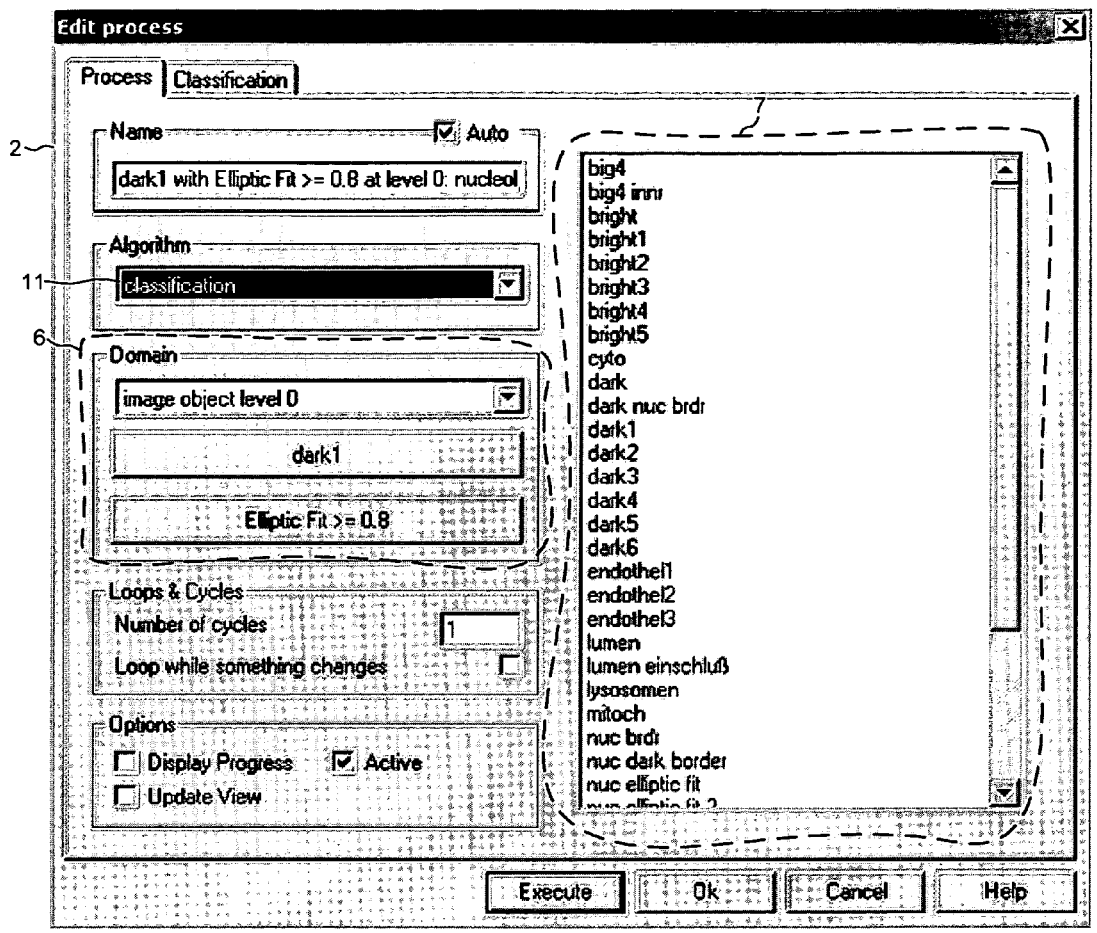
FIG. 4 is a screen shot representing a single processing object.

FIG. 4 is a screen shot representing a single processing object 2. The dialog element labeled "Algorithm" contains the selected algorithm 11 from the set of algorithms 10. An algorithm can be selected by the user from a drop list shown by an arrow button. The dialog element labeled "Domain" contains the description of the data domain 6 for the single processing object 2. The user can click an arrow button to select a data domain from a drop list. Data domains 6 are described by a structural subset of the data object network 4 as an additional classification condition labeled "dark1" and by an additional constraint labeled "Elliptic Fit>=0.8".

A dialog element labeled "Loops & Cycles" can be used to repeat the respective processing object 2 a certain number of times or until a stable state is reached. The large selection list on the right side shows all class objects 8 of the class object network 7. The user selects class objects 8 to specify the class domain 9.

Figure 5:
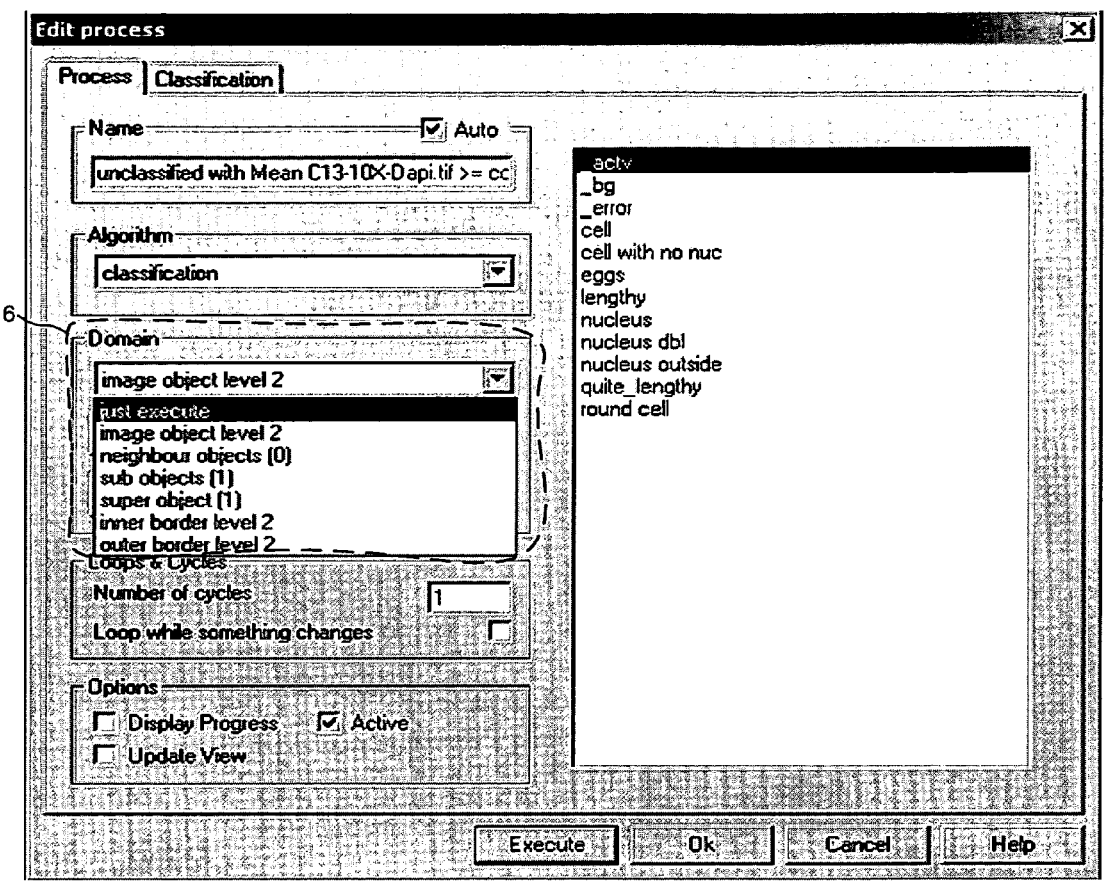
FIG. 5 is a screen shot representing a single processing object with a selection list of available data object domains.

FIG. 5 shows a single processing object with a selection list of available data object domains 6. In the dialog element labeled "Domain" there is shown the selection list of available data object domains 6 from which the user can select. The data domain 6 labeled "just execute" executes all linked sub-processing objects, preferably in series. Parallel execution, however, can also be implemented. The data-domain 6 labeled "image object level 2" addresses all data objects 5 on a certain hierarchical level of data objects 5. The data domain 6 labeled "neighbor objects (0)" addresses all data objects 5 neighboring data object 5, which is being processed by a super-ordinate processing object. The data object 6 labeled "sub object (1)" addresses all data objects 5 that are sub-data objects to data object 5, which is being processed by a super-ordinate processing object. The data object 6 labeled "super object (1)" addresses a data object 5 that is a super-ordinate data object to the data object 5, which is being processed by a super-ordinate processing object. As shown in FIG. 5, additional data domains 6 exist and can be defined by the user.

Furthermore, there is also the possibility to navigate through the data object network 4 using different data domains 6 in linked processing objects 2. For example, firstly the data domain 6 labeled "image object level 2" is selected to address all data objects 5 on a certain hierarchical level of the data objects 5. Secondly the data domain 6 labeled "sub object (1)" is selected to address all data objects 5 that are sub-data objects to a data object 5 addressed before and being processed by a super-ordinate processing object. Thirdly the data domain 6 labeled "neighbour objects (0)" is selected to address all data objects 5 neighboring to the data object 5 being addressed before and processed by a super-ordinate processing object.

Figure 6:
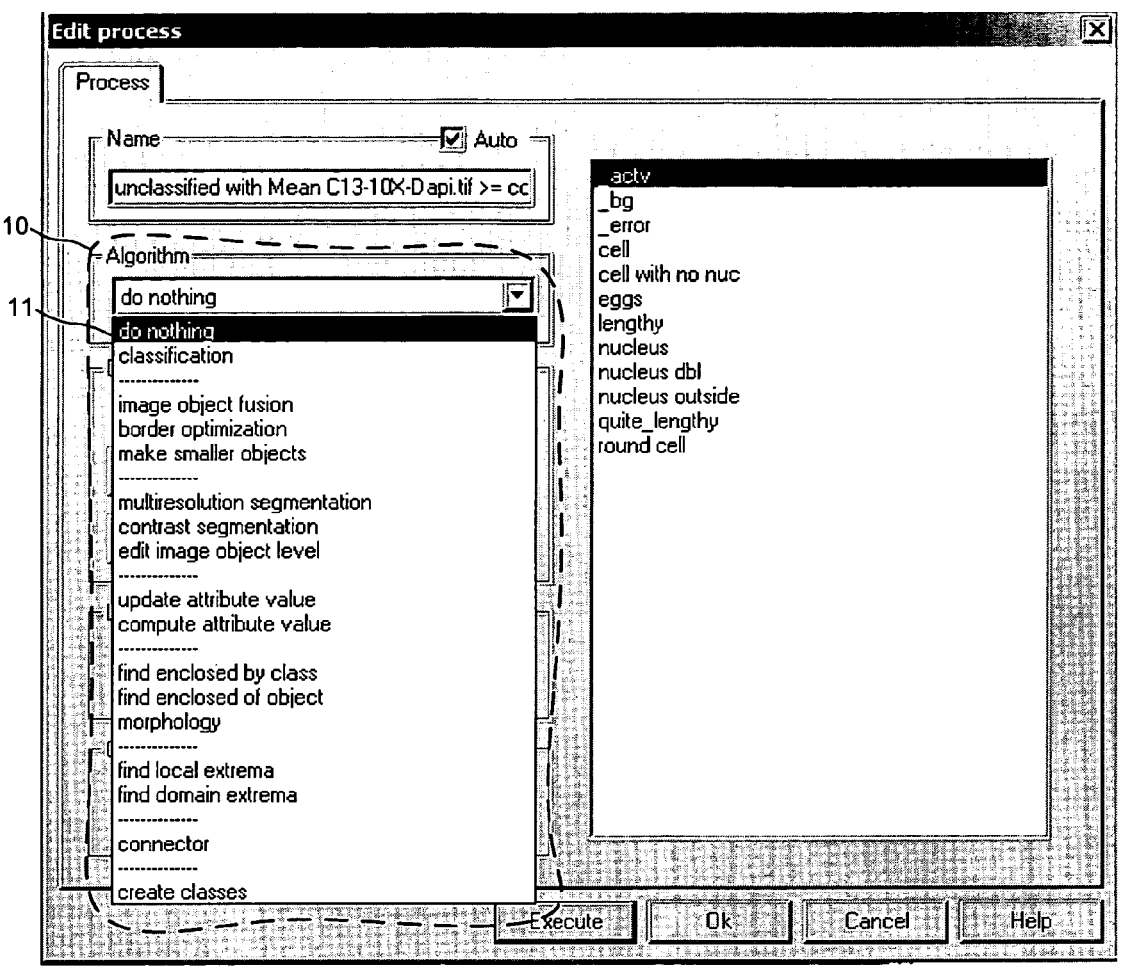
FIG. 6 is a screen shot of a single processing object with a selection list of an available set of algorithms.

FIG. 6 shows a single processing object with a selection list of an available set of algorithms 10. A selection list of available sets of algorithms 10 from which the user can select is shown in the dialog element labeled "Algorithm". For example, the algorithm 11 labeled "do nothing" does not process data object 5 of the processing object 2 itself, but rather passes data object 5 to its sub-processing objects for further processing. The algorithm labeled "classification" classifies all data objects 5 in the given data domain 6 with the class objects 8 in the given class domain 9. The algorithm labeled "multi-resolution segmentation" creates an initial data object network based on the input data by optimizing a certain shape and color criterion. The algorithm labeled "update attribute values" updates attribute values that can be linked to any other object in the entire semantic cognition network. The algorithm labeled "create classes" creates new class objects 2 in the class object network 7 according to a certain criterion. As shown in FIG. 6, additional algorithms exist and can be defined by the user.

Figure 7:
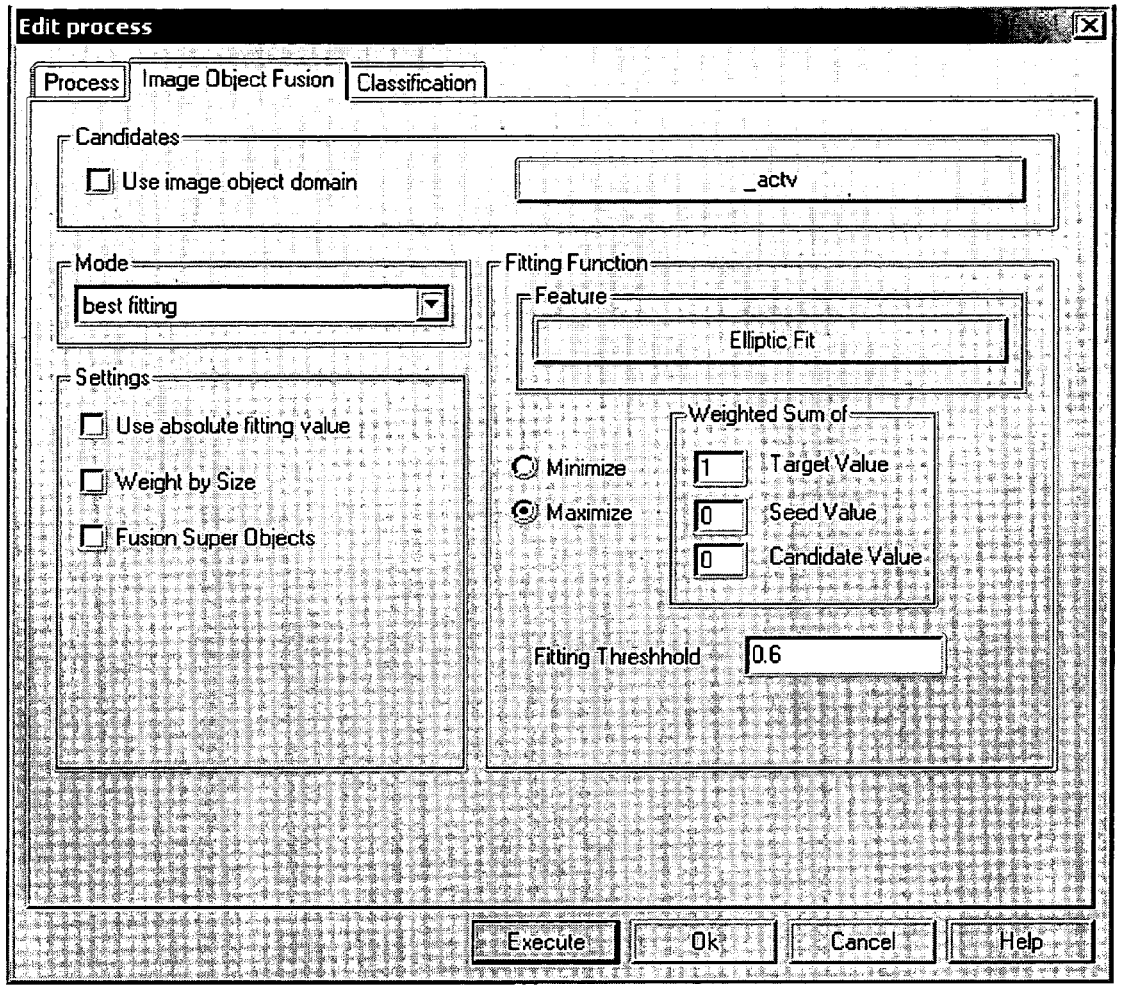
FIG. 7 is a screen shot of a parameter dialog for a special algorithm used by a single processing object.

FIG. 7 shows a parameter dialog for a special algorithm used by a single processing object. The parameter dialog shown serves for algorithm 11 labeled "image object fusion" shown in FIG. 6. Algorithm 11 labeled "image object fusion" merges two data objects 5 that are neighboring each other according to a certain criterion to obtain a further data object 5 consisting of the two data objects 5.

The dialog element labeled "Candidates" is used to specify the classification of the two neighboring data objects 5. The dialog element labeled "Fitting function" allows the user to define an optimization criterion composed of a data object feature such as here "Elliptic Fit" which measures a property of the two neighboring data objects 5 and a data object 5 generated by merging the two neighboring data 5 such as here the closeness to an ellipsis. However, any other property can also be used. Furthermore, the optimization criterion is also composed of a weighted sum of property values of the two neighboring data objects 5 and the data object 5 generated by merging the two neighboring data objects 5.

Radio buttons "Minimize" and "Maximize" are used to select whether the weighted sum of property values should be minimized or maximized. Finally, the resulting value weighted sum is compared with a fitting threshold which can also be selected by the user and is used to determine if the optimization is fulfilled or not.

If the optimization criterion is not fulfilled, the two neighboring data objects are not merged, and processing is completed. However, if the optimization criterion is fulfilled it is checked. For example, the optimization criterion is fulfilled if a mode for the fitting, such as "best fitting", which can also be selected by the user, is checked. If the mode for the fitting is fulfilled, the two neighboring data objects 5 are merged. However, if the mode of the fitting is not fulfilled, the process proceeds with one of the two neighboring data objects 5 and another data object 5 neighboring the one of the two neighboring data objects 5. The process mentioned above can be repeated until no further merging of data objects 5 occurs or until a certain number of cycles have been executed. The process mentioned above is an example of an important type of special processing objects, which is shown in FIG. 8 in a general manner.

Figure 8:
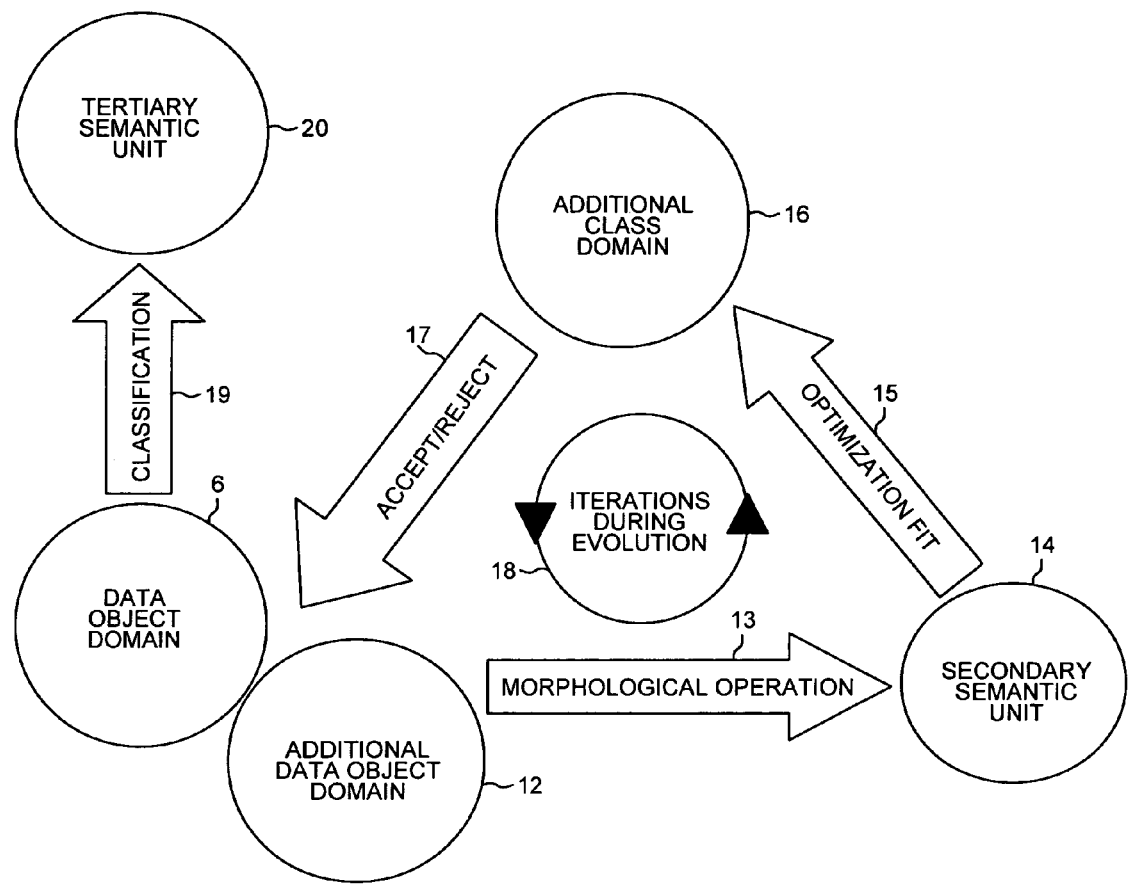
FIG. 8 is a diagram representing a classification-based object evolution performed in a triangle process.

FIG. 8 shows a classification-based object evolution performed in a triangle process. At the beginning of the triangle process a special processing object 2 is defined by selecting the data domain 6, the class domain 9, the algorithm 11, an additional data domain 12 in said data object network 4 and an additional class domain 16 in the class object network 7. The special processing network comprises the data domain 6, the class domain 9, the algorithm 11, the additional data domain 12 and the additional class domain 16.

Thereafter, a morphological operation 13 is performed using the algorithm 11 to combine the semantic units in the data domain 6 with the semantic units in the additional data domain 12 to create secondary semantic units 14. One of said secondary semantic units 14 is compared with a best-fitting one of the semantic units in the additional class domain 16 (see arrow 15) and said one secondary semantic unit 14 is accepted or rejected (see arrow 17) according to the fitting to thereby form a tertiary semantic unit 20.

Thereafter the aforementioned morphological operation 13 and the steps of comparing and accepting or rejecting (see arrow 17) are repeated until each tertiary semantic unit 20 is thereby removed from further processing. The aforementioned process can be performed such that each step is performed multiple times, as is shown by the circle 18 labeled "Iterations during evolution). Furthermore, multiple special processing units can be linked together before the morphological operation is performed to form an execution control based on how the multiple processing objects are linked.

There is additionally the possibility to define super-ordinate special processing object by selecting a special data domain in a special processing object network, the class domain 9 in the class object network 7 and the algorithm 11 in the set of algorithms 10. The super-ordinate special processing object comprises the special data domain, the class domain 9 and the algorithm 11. The special processing is compared to the semantic units in the class domain 9. Finally, the special processing object is removed from further processing if the special processing object fulfills a predetermined criterion.

By means of the aforementioned additional process, there is the possibility to observe the behavior in time of each processed object and to use this behavior for classification and other processing of the observed objects.

As has been already mentioned above, the present invention can be applied to data objects in general. However, one important application of the present invention is the application on picture data to classify pictures. One specific application of the present invention is the application on picture data in the field of life science where the pictures are microscopic pictures taken from tissue samples, microscopic pictures taken from suitable stained tissue samples, microscopic pictures taken from living or fixed cells and microscopic pictures taken with fluorescent microscopes or scanners, etc. Another important application of the present invention is the application on picture data in the field of geographical information extraction using satellite, airborne or other pictures.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A system for generating an application that analyzes image information, comprising:
   a computer readable storage medium; and
   a computer program stored on the storage medium comprising:
      a set of algorithms, wherein each algorithm of the set of algorithms represents an operation performable by the application;
      a plurality of data domains, wherein each of the plurality of data domains represents a subset of a data object network, and wherein the data object network is generated by segmenting the image information; and
      a graphical user interface usable to generate a processing object network, wherein the processing object network includes a parent process and a plurality of child processes, and wherein the parent process comprises one of the plurality of data domains and one algorithm of the set of algorithms.

2. The system of claim 1, wherein the computer program displays on the graphical user interface a list of each of the plurality of data domains and a list of each algorithm of the set of algorithms.

3. The system of claim 1, wherein a digital image comprises the image information, and wherein the computer program displays on the graphical user interface the data object network as an overlay over the digital image.

4. The system of claim 1, wherein the graphical user interface includes a dialog element in which a selection list of the set of algorithms is displayed.

5. The system of claim 1, wherein the graphical user interface includes a dialog element in which a selection list of the plurality of data domains is displayed.

6. The system of claim 1, wherein the parent process and the plurality of child processes are linked with each other to form an execution control for the application.

7. The system of claim 1, wherein the processing object network comprises a control structure of the application, and wherein the control structure is taken from the group consisting of a loop, a branch, a function call, a jump and an execution control.

8. The system of claim 1, wherein the plurality of child processes are linked with each other, and wherein the application executes one of the plurality of child processes as a sub-process.

9. The system of claim 1, wherein the subset of the data object network comprises data objects, and wherein the application executes the parent process several times, each time processing additional data objects.

10. The system of claim 1, wherein the computer program generates a semantic cognition network, and wherein the semantic cognition network comprises the data object network, the processing object network, and a class object network.

11. The system of claim 10, wherein the class object network comprises a class domain, and wherein the parent process is unambiguously defined by the one of the plurality of data domains, the one algorithm of the set of algorithms, and the class domain.

12. The system of claim 10, wherein the application performs a morphological operation using the one algorithm of the set of algorithms to combine data objects of the subset of the data object network with additional data objects to create secondary data objects.

13. The system of claim 12, wherein the application compares the secondary data objects with the class domain.

14. The system of claim 1, wherein the data object network and the processing object network are linked together by link objects that are dynamically generated by the application based on the one of the plurality of data domains.

15. The system of claim 1, wherein the parent process extracts a subset of data objects from the data object network and applies the one algorithm of the set of algorithms to each data object in the subset of data objects.

16. A system for generating an application that analyzes digital image data, comprising:
   a computer readable storage medium; and
   a computer program stored on the storage medium comprising:
      a set of algorithms, wherein each algorithm of the set of algorithms represents an operation performable by the application;
      a plurality of data domains, wherein each of the plurality of data domains represents a subset of a data object network, and wherein the data object network is generated by segmenting the digital image data; and
      means for generating a processing object network, wherein the processing object network includes a parent process and a plurality of child processes, and wherein the parent process comprises one of the plurality of data domains and one algorithm of the set of algorithms.

17. The system of claim 16, wherein the processing object network comprises a control structure of the application, and wherein the control structure is taken from the group consisting of a loop, a branch, a function call, a jump and an execution control routine.

18. The system of claim 16, wherein the subset of the data object network comprises data objects, and wherein the application executes the parent process several times, each time processing additional data objects.

19. The system of claim 16, wherein the parent process extracts a subset of data objects from the data object network and applies the one algorithm of the set of algorithms to each data object in the subset of data objects.

20. The system of claim 16, wherein the computer program displays a selection list of available data domains, and wherein the means generates the processing object network in response to the one of the plurality of data domains being selected from the selection list of available data domains.

21. A computer implemented method for generating an application that analyzes an image, comprising:
   adding a new processing object to a processing object network using a graphical user interface, wherein the processing object network includes a parent processing object and a child processing object, and wherein the image is displayed on the graphical user interface;
   designating that the new processing object is appended to the child processing object;
   selecting a data domain from a list of data domains displayed in a first dialog element on the graphical user interface and adding the data domain to the new processing object; and
   selecting an algorithm from a list of algorithms displayed in a second dialog element on the graphical user interface and adding the algorithm to the new processing object, wherein the application uses the new processing object to identify a portion of the image that is to be highlighted on the graphical user interface.

22. The method of claim 21, further comprising:
   configuring parameters of the algorithm by selecting from among available parameters displayed in a selection list in a third dialog element.

23. The method of claim 21, wherein the designating that the new processing object is appended is performed by selecting from a selection list in a third dialog element, and wherein the selection list includes an append option and a create subprocess option.

24. The method of claim 21, wherein the selecting the data domain is performed by clicking on an option listed in a selection list of available data domains.

* * * * *